W. R. HEPNER.
HUB CONSTRUCTION.
APPLICATION FILED FEB. 27, 1912.
1,088,575.
Patented Feb. 24, 1914.
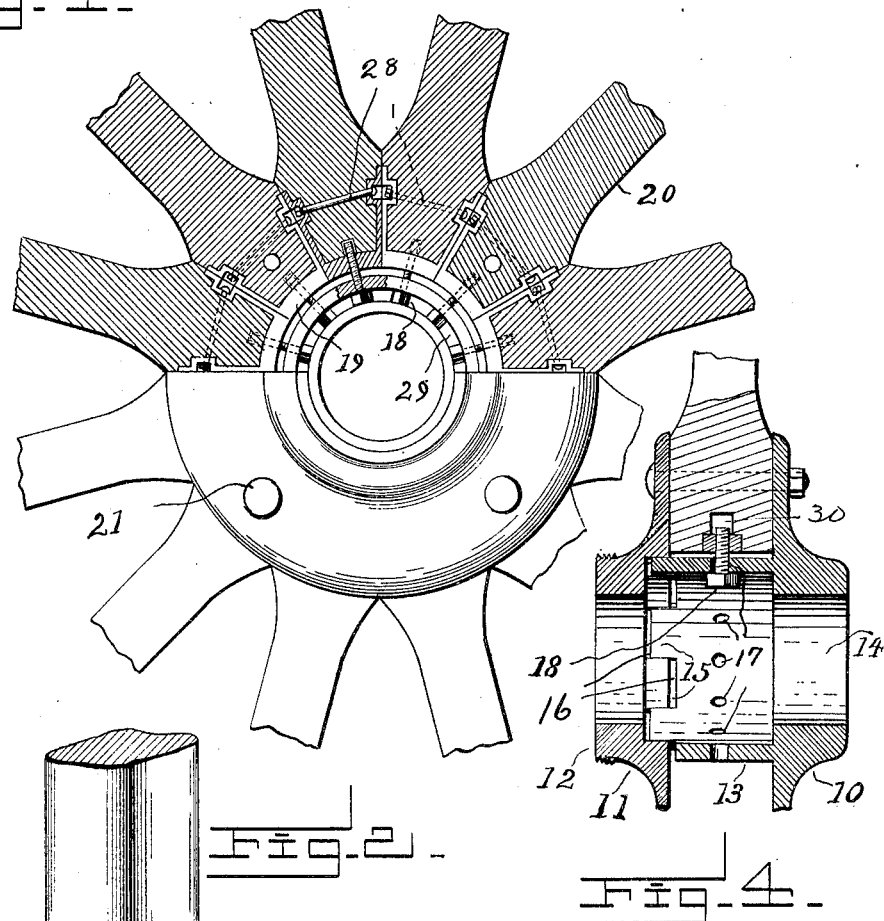
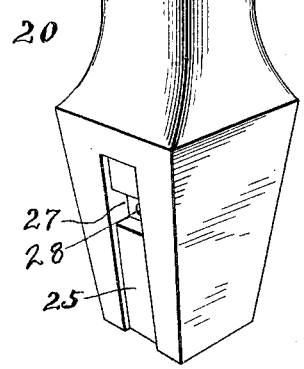
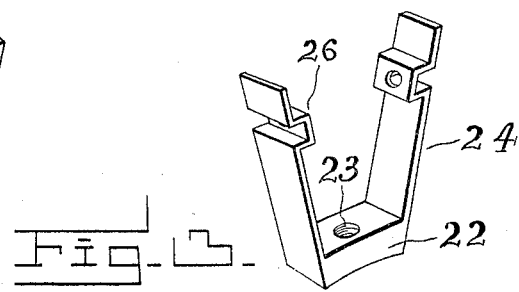
Inventor
W. R. Hepner,
By H. L. Woodward
Attorney
Witnesses

UNITED STATES PATENT OFFICE.

WALTER RUSSELL HEPNER, OF KALISPELL, MONTANA, ASSIGNOR OF ONE-HALF TO CHARLES M. DODSON, OF MOUNT JACKSON, VIRGINIA.

HUB CONSTRUCTION.

1,088,575. Specification of Letters Patent. Patented Feb. 24, 1914.

Application filed February 27, 1912. Serial No. 680,183.

*To all whom it may concern:*

Be it known that I, WALTER RUSSELL HEPNER, a citizen of the United States, residing at Kalispell, in the county of Flathead and State of Montana, have invented new and useful Improvements in Hub Construction, of which the following is a specification.

This invention relates to hub construction in vehicle wheels, and particularly to means for securing spokes therein so that there will be no looseness under wear of the mortised parts.

The object of the invention is to provide efficient means for tightening spokes in a hub after they have become slightly loosened under the vibration and racking to which vehicles are often subjected.

Another object is to provide such means in a form whereby it will not tend to make the wheel bulky or unsymmetrical, and may be entirely concealed within the hub.

It is another object to so construct the device that it will be protected from the weather, whereby it may be easily operated even after being subjected to use over a considerable period of time.

A further aim is to enable the manufacture of the necessary elements in an inexpensive manner and to avoid undue expense for labor in assembling.

An additional object is to enable the readjustment of the spokes after having become loosened without taking down the wheel, and with the use of simple implements.

Other objects and advantages will be apparent from the specification and from the drawings, in which—

Figure 1 is a fragmentary view of a wheel partly in section, showing particularly one embodiment of my invention. Fig. 2, is a detail perspective view of a spoke. Fig. 3 is a similar view of one of the anchoring members. Fig. 4 is a fragmentary section of a wheel taken at right angles to Fig. 1.

There is illustrated a portion of a hub including the inner and outer flange elements 10 and 11, forming the hub proper, and which may be of any suitable or customary interior form and construction to accommodate various styles of bearings, or to be secured upon an axle, although such construction is not illustrated, as being well known and not being an essential part of my invention. Each of the flange elements are disk-like, with outwardly projecting hub portions 12 centrally bored or otherwise shaped in a proper manner. The inner section is provided with a cylindrical sleeve 13 spaced a short distance outwardly of the bore 14 of the hub, its outer end being crenelated as at 15, and adapted to mesh with a corresponding series of recesses 16 formed in the outer section 11. The sleeve is provided with a series of openings 17 therearound between its ends corresponding in number to the number of spokes which are to be incorporated. Engaged slidably through each opening there is a bolt 18 in threaded engagement with spoke retainers 19 to be described, which retainers are respectively engaged with spokes 20 having snugly abutting radial faces and are held snugly between the flanges by means of suitable bolts 21 and nuts which draw the flanges toward each other and against the spokes. In the event of loosening of the spokes between the flanges the two parts may thus be drawn toward each other to compensate for the deterioration, and the intermeshing portions of the sleeve and front section are proportioned to allow this adjustment, as may be seen in Fig. 4.

The spoke retainers each comprise the base block 22 having the threaded opening 23 therethrough and provided with resilient arms 24 at each side adapted to engage snugly against the sides of a spoke, the block at the same time abutting snugly against the inner ends of the spokes. The block and arms may be the full width of the spokes or, as shown, of considerably less width and fitted in a suitable channel 25 formed in opposite faces of the spoke as shown in Fig. 2, which allows the spoke surfaces to abut snugly against each other on each side of the retainer, although it is obvious that if desired the retainer arms may be fitted to the spoke faces abutting the hub flanges if desired. Each arm is provided adjacent its outer end with an inwardly projecting lug or shoulder 26, and the spokes are provided with correspondingly located and shaped recesses 27 into which the lugs are adapted to be fitted tightly. Although not deemed essential, the arms may be secured to the spoke by means of a bolt or rivet 28 suitably engaged through the spoke and secured to the arms on each side of the spoke. The spokes are so formed at their inner ends as to abut and fit tightly against each other leaving a space 29 between the sleeve 13 and the blocks 22. If necessary suitable recesses 30 are formed in the inner ends of the spokes to receive the ends of the bolts 18 without bearing upon the spokes when screwed home.

It will of course be understood that the familiar practice of providing the opposed sections of the hub—the flanges 11 and 10—with staggered lugs forming spoke mortises may be followed if desired without affecting the utility of my invention, such construction being so generally understood that it is not deemed necessary to illustrate it.

In the use of my invention various methods may be followed, but it is believed preferable to assemble the wheel on the inner section 10 before the outer one 11 is attached, as it is then possible to observe, as in the upper part of Fig. 1, the positions of the spokes with respect to the axis of the hub, and an approximate centering thereof attained with facility and rapidity. Certain of the spokes are transversely bored for the passage of the bolts 21. An accurate centering of the spokes may be attained by operation of the bolts 18, the heads of which are brought to bear on the sleeve 13 to draw the spokes forcibly inward. After proper adjustment in this manner the flanges of the hub are drawn forcibly against the spokes by means of the bolts 21 and nuts thereon.

It will be seen that should the spokes become loosened and oscillate in the plane of the wheel, they may be tightened by means of the bolts 18 at any time, by exposing their heads for engagement by a suitable tool.

What is claimed is:—

1. A wheel construction including spoke-retaining flanges and a sleeve inwardly thereof, forming part of the hub, a spoke-retaining member constructed to be fixed upon a spoke, a bolt element engaged revolubly through the sleeve and in threaded engagement with the spoke-retaining member, for the purposes described.

2. A wheel construction comprising a hub having a spoke receiving portion and a fixed sleeve inwardly thereof, a multiplicity of spokes engaged therein, said spokes having recesses in opposite faces, retainers each having spaced arms constructed and adapted to embrace a spoke end, said arms having lugs arranged to engage in said recesses, each retainer having a threaded opening therein radially of the hub; openings being formed in the sleeve in registry with those in the retainers, and bolt members projected through the sleeve and engaged in the openings of respective retainers, for the purposes described.

3. A wheel construction comprising a hub including separable flange members, one of the flange members having a concentric sleeve projecting inwardly therefrom and in engagement with the other, said other flange and the sleeve having adjustably interlocking portions, said sleeve having peripherally spaced openings therethrough, a plurality of headed bolts projected outward through respective openings, and spoke retainers constructed and adapted to be fixed upon spoke ends, and having threaded openings therein for engagement with the bolts and operation as described.

In testimony whereof I have hereunto set my hand in presence of two subscribing witnesses.

WALTER RUSSELL HEPNER.

Witnesses:
E. F. STAPLES,
D. R. RIEDEL.

---

Copies of this patent may be obtained for five cents each, by addressing the "Commissioner of Patents, Washington, D. C."